Jan. 17, 1928.
R. L. PARISH
1,656,228
CONTAINER AND SEALING MEANS THEREFOR
Filed May 6, 1927
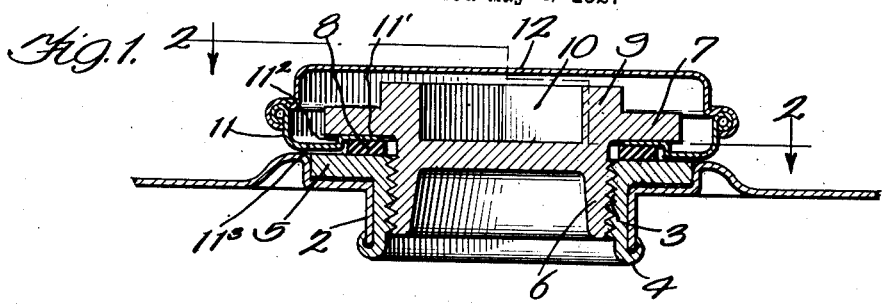
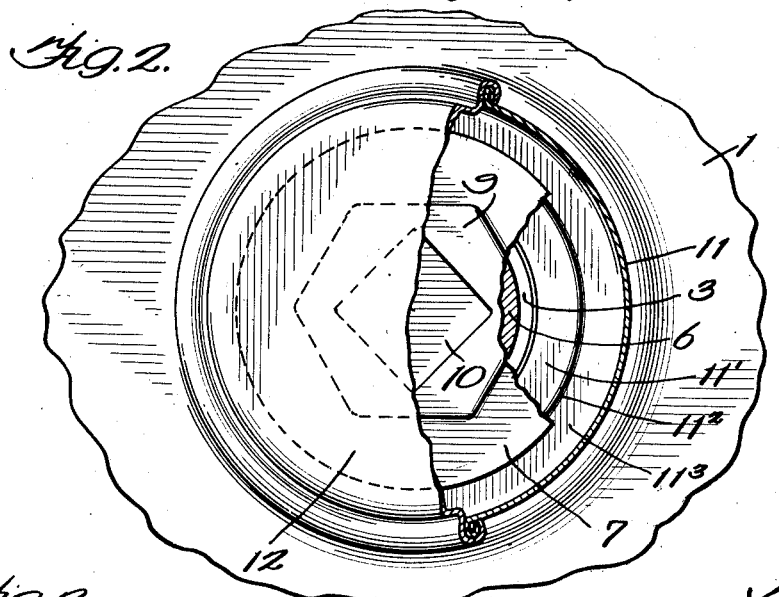
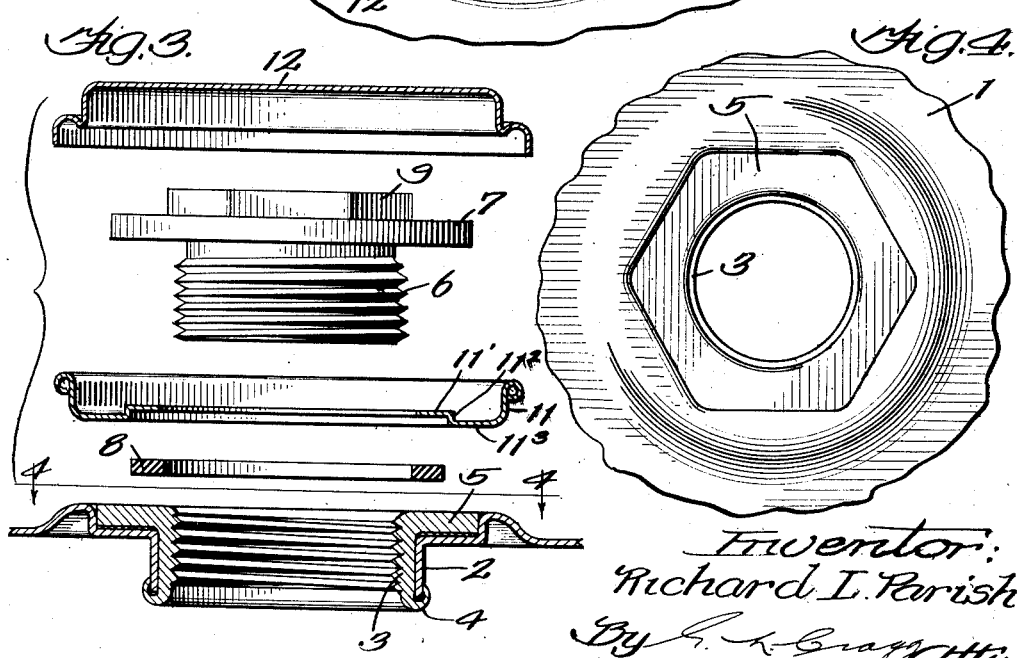
Inventor:
Richard L. Parish
By ... Atty.

Patented Jan. 17, 1928.

1,656,228

UNITED STATES PATENT OFFICE.

RICHARD L. PARISH, OF CHICAGO, ILLINOIS, ASSIGNOR TO AMERICAN FLANGE & MANUFACTURING COMPANY, OF CHICAGO, ILLINOIS, A CORPORATION OF ILLINOIS.

CONTAINER AND SEALING MEANS THEREFOR.

Application filed May 6, 1927. Serial No. 189,309.

My invention relates to containers which are provided with bungs in the form of threaded plugs which are received within the threaded interiors of bushings that are assembled with wall portions of the containers, the invention finding particular use in connection with barrels in which oil or other liquid is packaged for shipment.

The invention has for its object the provision of improved means for obstructing undetectable access to and removal of the plugs. These plugs or bungs are provided with flanges at their outer ends which press upon annular sealing gaskets that are interposed between the plug flanges and the contiguous container walls. In a well-known structure, an interiorly threaded bushing is assembled with a container and receives a closure plug, this bushing having a flange which is in lapping relation to the portion of the container wall that surrounds the opening in which the body of the bushing is received. A sealing gasket is interposed between the flange upon the plug and the flange upon the bushing. To guard against the undetectable access to and removal of the plug, a hood is employed having a body portion clamped between the plug flange and the bushing flange and a cap portion joined with the body portion and covering the outer end of the plug. In order that the sealing gasket above referred to might be sealed and guarded from removal, the base portion of the hood is clamped between the gasket and the bushing flange by the action of the plug flange when the plug is screwed home. It is common practice to paint the container, especially if it is employed for packaging oil or other liquid for shipment, and also to paint the flange of the bushing. If care is not taken, the paint coating may be so rough, that leakage is apt to occur between the base portion of the hood and the bushing flange. I, therefore, interpose the base of the hood between the gasket and the flange upon the plug to take up the thrust and turning action as the plug is screwed into place. In order that the gasket may still be guarded from removal, I make the base portion of the hood of step formation so that it will closely approach the portion of the bushing flange that surrounds the gasket.

The invention will be more fully explained in connection with the accompanying drawing in which Fig. 1 is a view in diametrical cross section illustrating a container wall equipped in accordance with my invention; Fig. 2 is a plan view of the structure shown in Fig. 1 with parts broken away; Fig. 3 is a view showing parts that appear in Fig. 1 in separated relation, some of these parts being shown in section; and Fig. 4 is a face view of the container wall with a flanged bushing assembled therewith, the gasket and plug being removed.

The container, such as a barrel, has one wall 1 thereof formed with a depending rim 2 which surrounds a circular hole formed through this wall. An interiorly threaded bushing 3 is snugly received within this hole and is closely surrounded by said rim, this bushing being shown with an outwardly curled inner edge portion 4 which grips the inner edge of said rim 2 and a circumscribing flange 5 which is tightly seated upon the wall 1, this flange desirably lapping this wall on the exterior of the container. The closure plug 6 is screwed within the bushing 3 and is formed with a circumscribing flange 7 which laps the flange 5 and wall 1, an annular sealing gasket 8 being desirably interposed between the flanges to render the joint between the plug and bushing fluid-tight. The outer end of the plug is formed with two tool engaging formations, one in the form of an enlargement 9 which is of hexagonal or polygonal exterior contour, and the other in the form of a recess 10 extending through the enlargement 9 and into the body of the plug, this recess being of square or other contour to receive a wrench having a plug formation snugly receivable within and corresponding in shape to said recess.

The sealing device or guard is preferably in the form of a hood comprising a body or skirt portion 11 which has an inwardly turned base part 11' that is confined between the gasket 8 and the plug flange 7, this hood body or skirt being firmly clamped in position when the screw plug is driven home, the portion of the body between the flanges upon the plug and bushing being tightly clamped between these two flanges and particularly between the plug flange 7 and the sealing gasket 8. Said hood also includes a cap portion 12 which is not initially assembled or fully assembled with the body or skirt portion 11, the closure plug being tightly applied before the cap is finally assembled to enclose the plug portions 7, 9. A suitable tool is employed for so thoroughly incorporating the ring portions of the hood body and cap together that the cap portion can not be removed without the removal being detectable.

All of the plug upon the exterior of the container is thoroughly guarded from undetectable access by the construction described. The gasket 8 has direct engagement with the outer face of the bushing flange 5 and being of rubber or similar conformable material, it will adapt itself to irregularities that might be due to paint upon this flange. The gasket is guarded from removal by the base portion of the hood which has an annular step $11^2$ formed therein which is in the zone of the gasket, the annular portion of the hood base $11^2$ which surrounds this step being so close to the bushing flange as to guard against the admission of a dislodging tool to the gasket.

Having thus described my invention, I claim:

1. The combination with a container formed with a hole through a wall thereof; of a closure plug within said hole and having a flange lapping said wall; a sealing gasket clamped between the plug flange and said container wall; and an annular guard having a base portion clamped between said gasket and plug flange whereby as said plug is screwed into position it will bear directly on said guard without injury to said gasket.

2. The combination with a container formed with a hole through a wall thereof; of an interiorly threaded bushing received in said hole and assembled with said wall, said bushing having a circumscribing flange which laps the wall where the wall surrounds said hole; a closure plug within said hole and having a flange lapping the bushing flange; a sealing gasket clamped between said flanges; and a hood comprising a body portion having a base portion clamped between said gasket and plug flange to receive the thrust of the plug as it is screwed into place, said base portion having a part in the zone of and surrounding the gasket to guard against access of a dislodging tool to the gasket and a cap portion joined with said body portion and covering the outer end of the plug.

In witness whereof, I hereunto subscribe my name.

RICHARD L. PARISH.